(12) United States Patent
Jassowski et al.

(10) Patent No.: US 10,324,462 B2
(45) Date of Patent: Jun. 18, 2019

(54) DRONE SWARM FOR INCREASED CARGO CAPACITY

(71) Applicant: Intel Corporation, Santa Clara, CA (US)

(72) Inventors: Michael A Jassowski, El Dorado, CA (US); Ashwin S Thirunahari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 15/395,180

(22) Filed: Dec. 30, 2016

(65) Prior Publication Data
US 2018/0188724 A1 Jul. 5, 2018

(51) Int. Cl.
*G05D 1/00* (2006.01)
*B64C 39/02* (2006.01)
*G05D 1/10* (2006.01)

(52) U.S. Cl.
CPC ......... *G05D 1/0027* (2013.01); *B64C 39/024* (2013.01); *G05D 1/104* (2013.01); *B64C 2201/128* (2013.01); *B64C 2201/143* (2013.01)

(58) Field of Classification Search
CPC ........ G05D 1/0027; G05D 1/104; B64D 3/00; B64D 1/02; B64D 1/22; B64C 39/024; B64C 2201/128; B64C 2201/143; B64C 2201/146
See application file for complete search history.

(56) References Cited

U.S. PATENT DOCUMENTS

| 5,521,817 | A | * | 5/1996 | Burdoin | ............... | G05D 1/0027 244/190 |
| 9,205,922 | B1 | * | 12/2015 | Bouwer | ................... | B64D 9/00 |

(Continued)

FOREIGN PATENT DOCUMENTS

| KR | 101614620 B1 | 4/2016 |
| KR | 101636478 B1 | 7/2016 |
| WO | WO-2014080386 A2 | 5/2014 |

OTHER PUBLICATIONS

"International Application Serial No. PCT/US2017/063113, International Search Report dated Mar. 12, 2018", 3 pgs.

(Continued)

*Primary Examiner* — Spencer D Patton
(74) *Attorney, Agent, or Firm* — Schwegman Lundberg & Woessner, P.A.

(57) ABSTRACT

Systems and methods may use a drone swarm to increase cargo capacity. A drone swarm may include a networked drone system or two or more drones, such as a parent drone and a child drone. A method may include receiving support component balance information captured by an inertial measurement unit on the support component supported by a parent drone, adjusting movement of the parent drone according to a control system using the support component balance information, receiving an indication of a low battery in a drone in the networked drone system, the indication including an identification of a replacement drone to replace the drone with the low battery in the networked drone system, and sending a reconfiguration command to at least one child drone to incorporate the replacement drone in the networked drone system.

25 Claims, 7 Drawing Sheets

(56) References Cited

U.S. PATENT DOCUMENTS

| | | | |
|---|---|---|---|
| 2015/0327136 A1* | 11/2015 | Kim | H04W 36/08 |
| | | | 370/331 |
| 2016/0236778 A1 | 8/2016 | Takayama et al. | |
| 2016/0304217 A1 | 10/2016 | Fisher et al. | |
| 2016/0378108 A1 | 12/2016 | Paczan et al. | |
| 2018/0246529 A1* | 8/2018 | Hu | G05D 1/0202 |

OTHER PUBLICATIONS

"International Application Serial No. PCT/US2017/063113, Written Opinion dated Mar. 12, 2018", 11 pgs.

* cited by examiner

DRONE SWARM FOR INCREASED CARGO CAPACITY

BACKGROUND

Drones are increasingly being used to carry packages, such as for delivery to homes and businesses. Challenges for package delivery often include limitations on cargo weight due to lift capability limits of a drone. A drone based package delivery is also limited in delivery distance due to battery life of the drone. In some circumstances, drones are unreliable and prone to failure, which causes packages to be lost or damaged.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
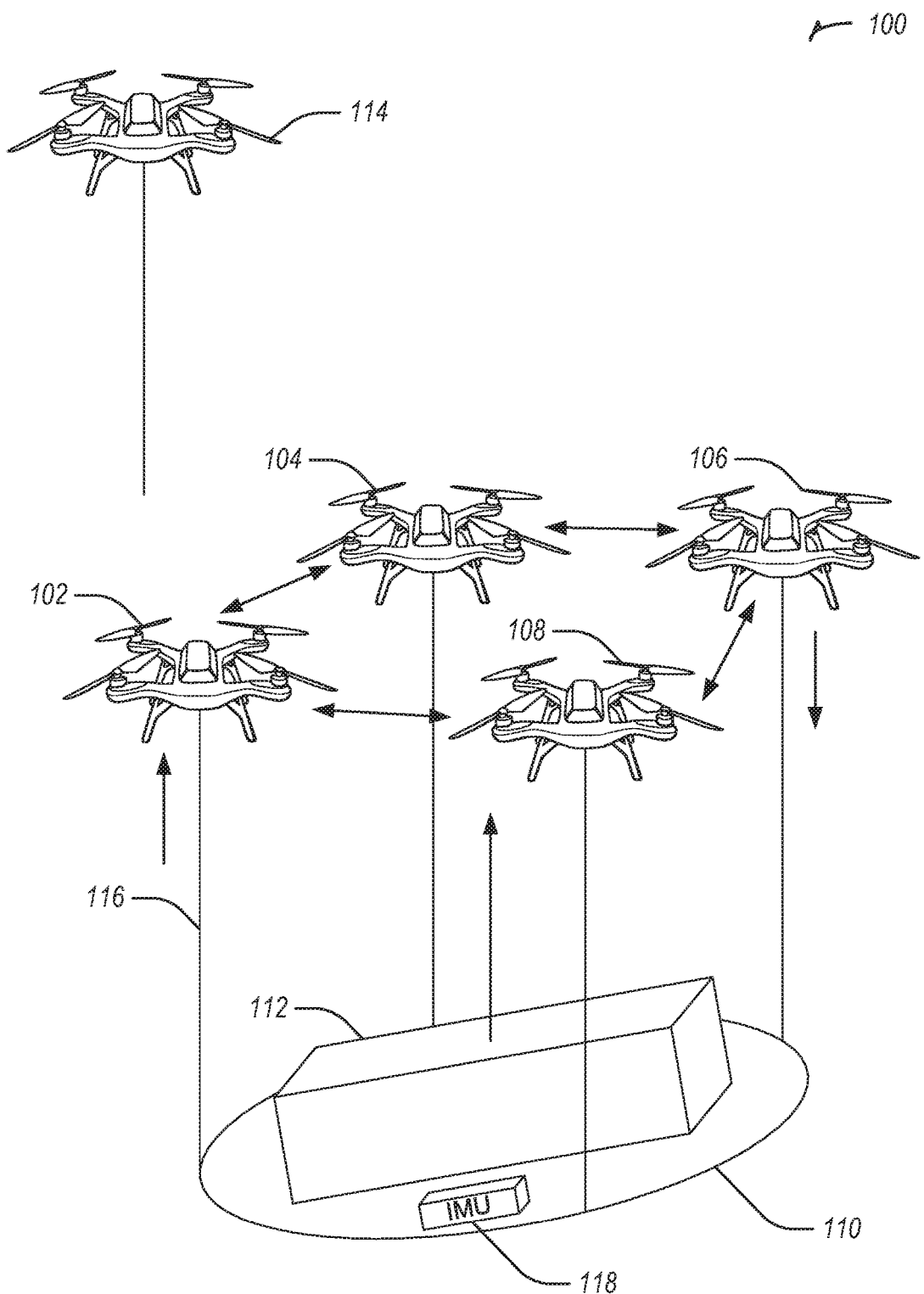
FIG. 1 illustrates a system including networked drones for conveying a support component in accordance with some embodiments.

Systems and methods for using networked drones are described herein. The systems and methods described herein may use networked drones to support and move a support component, such as a platform, net, box, etc. The networked drones may include a parent drone and one or more child drones. The parent drone may be controlled remotely and the child drones may move automatically in accordance with the parent drone movement. The networked drones may keep the support component stable at level or at a particular angle. The networked drones may work together to increase capacity and extend carry distance over a single drone delivery system.

A networked drone system may be used to increase cargo carrying capacity over a single drone. Two or more drones used in the networked drone system may distribute a cargo load to increase the total system carrying capacity without increasing an individual drone load. In an example, the networked drone system may use an inertial measurement unit (IMU) mounted on, or attached to, a support component such as a cargo platform, a net, a box, etc. The IMU may be used to provide cargo orientation feedback. The feedback may be used, such as in a feedback loop (e.g., with a control system using a proportional-integral-derivative (PID) controller or the like) to control movement of one or more drones in the networked drone system to maintain stability or an orientation of the support component. The IMU may communicate with a single parent drone, which may in turn communicate with one or more child drones of the networked drone system, or the IMU may communicate with any of the drones in the networked drone system.

In an example, drones in a networked drone system may include a camera, such as a camera on each drone in the networked drone system. The camera or cameras may be used to measure a distance between two drones in the networked drone system. For example, neighboring drones may use a camera to detect a distance between the drones and the drones may be controlled to maintain a predetermined distance (e.g., change the distance to the predetermined distance). In an example, the camera may be a depth camera. The camera or cameras may provide inter-drone distance feedback to maintain equal spacing between drones.

The networked drone system may be scaled to increase cargo carrying capacity. The drones in the networked drone system may have redundancy, that is, the networked drone system may continue to operate normally when one (or more than one in some example systems) drone of the networked drone system fails. Drones in the networked drone system may be replaced, such as when a drone fails or a battery of the drone dies or is low. The drones may be replaced in flight so as to not lose delivery time. Replacing drones may be used to extend range of the networked drone system. Using the networked drone system may be safer than a single heavier drone with equivalent cargo capacity, such as due to potential failure or orientation errors in the single heavier drone.

The networked drone systems described herein may have a precision flight formation (e.g., within centimeter accuracy) to align magnets or mechanical connections during flight. Strong magnets used to connect the drones to the support component may be located at a position on the support component so as to not interfere with IMU magnetometers. The drones may remain in a vertical angle of view for a camera to determine distances between drones.

FIG. 1 illustrates a system 100 including networked drones (e.g., 102-108) for conveying a support component 110 in accordance with some embodiments. The support component 110 may be used to carry or convey cargo 112 (e.g., for delivery). The cargo 112 may be strapped in or otherwise secured to the support component 110. The system 100 includes an IMU 118 on the support component 110 to sense orientation (e.g., pitch, roll, and yaw). The IMU may communicate the orientation and provide feedback to a parent drone 102, or to child drones (e.g., 104-108). The IMU may communicate with a drone (e.g., 102-108) via a wireless connection, such as Bluetooth, IEEE 802.11 (Wi-Fi), or a custom RF link, or via a communication wire along a cable (e.g., cable 116).

The support component 110 may move during transit (e.g., due to wind, pressure changes, object collisions, momentum, etc.). When the support component 110 is at a pitch angle relative to a horizontal, the drones may adjust to compensate and force the support component 110 back to a horizontal pitch. For example, the support component 110 is at a pitch angle in FIG. 1. The child drone 106 may move downward to decrease upward lift from the child drone 106 and the parent drone 102 may move upward to increase upward lift from the parent drone 102. These movements may force the support component 110 back to a level pitch angle. In an example, the cable 116 may be a rigid member, such that a downward force may be exerted on the support component 110. In another example, the cable 116 may be loose such that it may not exert a downward force, but may be used to exert an upward force when pulled taught by the parent drone 102 moving upward. In yet another example, a rigid support cable may be attached to the bottom of the support component 110 such that a drone lifts the support component 110 by applying upward force on the rigid cable from below. The cable 116 may have a different length than other cables in the system 100.

In an example, a drone may be attached to another drone (e.g., stacked) or multiple drones may be attached to a single support cable. In another example, cables may be attached to the support component 110 at an angle. In yet another example, the support component 110 may include multiple levels connected by cables. When the support component 110 experiences a yaw rotation, the drones (e.g., 102-108) may deviate in the horizontal plane to counter the yaw rotation.

In an example, a drone (e.g., 102-108) may have a camera (e.g., a depth camera, such as a high definition camera, an infrared camera, an infrared laser projector, or a combination of two or all three of these cameras, or another accurate distance/angle measuring sensor, such as a LIDAR (light radar) sensor). The camera may be pointed at a neighbor drone (e.g., a camera on the child drone 106 may be pointing at child drone 104, child drone 108, or both). A drone's PID feedback loop may maintain a distance to a neighbor drone. For example, the child drone 106 may maintain a first distance from the child drone 104 and a second distance from the child drone 108 (and the first and second distances may be the same). The child drones 104 and 108 may keep specified distances from the child drone 106 and the parent drone 102. In an example, one of the drones (e.g., the parent drone 102) may be used to control the system (e.g., receive a remote control or predetermined control to move in a specified direction) and may not have a camera.

The drones in the system 100 may be controlled by directing single drone (e.g., the parent drone 102). The other drones (e.g., the child drones 104-108) may maintain distances (e.g., from the parent drone 102 or other neighbor drones), while also satisfying the IMU stability constraint control. Although four drones are shown in FIG. 1, any number of drones may be used greater than three for simple stability control. In an example, two drones may be used with advanced stability controls or additional cables. The greater the number of drones used in the system 100, the more redundancy and cargo carrying ability of the system 100, at the cost of increased overhead in number of drones. A limit on the number of drones may be determined using flight clearance for the drones (e.g., the propellers or other components of the drones may not overlap) and the support component 110 physical properties (e.g., circumference or area).

In an example, a drone in the system 100 may be controlled in response to movement by the support component 110 (e.g., changes to an angle), sensed by the IMU 118, which may send information regarding the movement or angle change to one or more of the drones (102-108). A drone may add a correction term to its drone height PID feedback loop for the roll, pitch, or yaw of the support component 110. The drone may detect a distance (e.g., using a camera or sensor) from the drone to another drone and maintain that distance while correcting the support component 110 angle. For example, this process may be an iterative feedback loop that converges on stable angles for the support component 110 and the predetermined distances from neighbor drones. An additional input may be a remote control of the parent drone 102. The remote control may cause the parent drone 102 to be perturbed. The child drones 104 and 108 may add the change in distance from the parent drone 102 into their respective feedback loops to maintain the predetermined distance with this additional change. The distances then may be iteratively updated to additional drones (e.g., child drone 106) maintaining predetermined distances from the child drones 104 and 108.

In an example, any of the child drones 104-108 may assume the parent role. For example, when the parent drone 102 is removed from the system 100, has a low battery, or fails, one of the child drones 104-108 may take over to control the system 100 and become a new parent drone. The new parent drone may be controlled remotely and operate as the previous parent drone did without interruption to the system 100 (e.g., while in-flight).

In an example, a spare drone 114 may be stored on a charging platform. The spare drone 114 may be inserted into the system 100 in-flight. The spare drone 114 may attaches to the support component 110. Examples for attaching the spare drone 114 to the support component 110 are described in further detail below in FIGS. 2-4.

In an example, the spare drone 114 may be added to the system 100 in response to a failure of one of the drones 102-108. When a drone fails, the spare drone 114 may be added to the system 100 and the remaining functional drones may be shifted for efficient control of the support component 110. If the drone that fails cannot move, it may be deadweight and additional spare drones may be added to the system to compensate for the weight. If the drone that fails still moves, it may detach or become detached from the support component 110. The drones 102-108 may move closer together on one side of the support component 110 (e.g., compress the distances between the drones) to allow the spare drone 114 to enter and attach to the support component 110. Once the spare drone 114 is attached to the support component 110, the failed drone may be removed from the support component 110 (e.g., the drones 102-108 and 114 may shift to allow the failed drone to detach). After the failed drone detaches, the remaining drones, including the spare drone 114 may be rearranged for efficient control of the support component 110. If the failed drone was the parent drone 102, a new parent drone may be selected, either from the child drones 104-108 or the spare drone 114.

In an example, the spare drone 114 may be added to the system 100 in response to a low battery of one of the drones 102-108. When a drone has a low battery, the spare drone 114 may be sent to be added to the system 100. The remaining drones may be shifted for efficient control of the support component 110. The low battery drone may detach from the support component 110 before the spare drone 114 is added if there is sufficient cargo carrying capacity redundancy among the remaining drones or after the spare drone 114 is added if not (or for the sake of redundancy). The remaining drones (e.g., 102-108) may move closer together on one side of the support component 110 (e.g., compress the distances between the drones) to allow the spare drone 114 to enter and attach to the support component 110. After the low battery drone detaches, the remaining drones, including the spare drone 114 may be rearranged for efficient control of the support component 110. If the low battery drone was the parent drone 102, a new parent drone may be selected, either from the child drones 104-108 or the spare drone 114. If more than one drone has a low battery, the process may be iterated to introduce new spare drones. In another example, the spare drone 114 may be added to the system 100 as a redundancy. The drone with the low battery may lands on a charging platform (e.g., the charging platform vacated by the spare drone 114).

In an example, the parent drone 102 may be controlled remotely by sending a command to the IMU, which may communicate locally with the parent drone 102. In another example. The IMU may communicate with one of the drones 102-108 at a given time as a parent drone (e.g., the IMU may select a parent drone with each communication or may select a drone as the parent drone until that drone is replaced in the system 100). In another example, the parent drone 102 may relay information to the (e.g., a desired tilt angle for carrying a particular package).

Control of the parent drone 102 for guiding the system 100 to a navigation point (e.g., to pick up or deliver a package, such as the cargo 112) may use a remote control system. The remote control system may be controlled by a user (e.g., to input coordinates or control the parent drone 102 in real time). In an example, controls for the parent drone 102 may be preset, (e.g., map or GPS coordinates may be entered, a flight plan may be preset, or the like).

Figure 2:
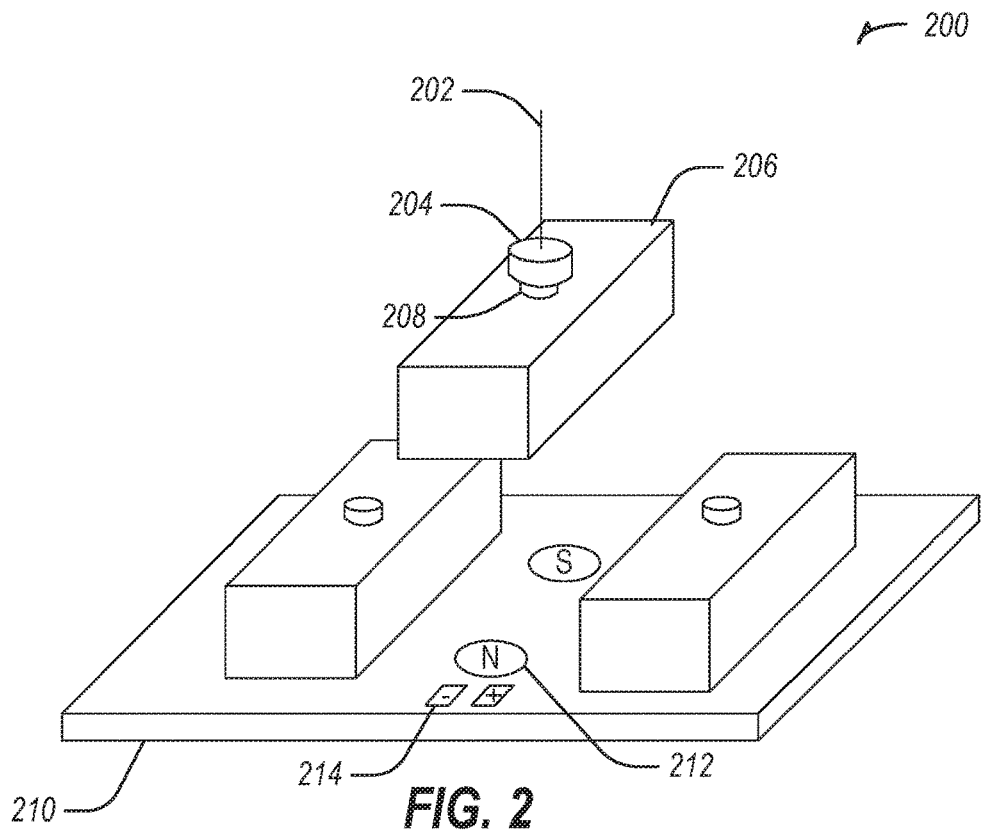
FIG. 2 illustrates a magnetic drone attachment system in accordance with some embodiments.

FIG. 2 illustrates a magnetic drone attachment system 200 in accordance with some embodiments. The magnetic drone attachment system 200 may use a permanent magnet (not shown) on the bottom of a platform connection component 206 to connect the platform connection component 206 with a support component 210 (e.g., a platform). The permanent magnet on the bottom of the platform connection component 206 may magnetically couple with the support component 210 using electrically reversible magnetic zones 212. The electrically reversible magnetic zones 212 may be electrically controlled to create a magnetic field to magnetically couple with the permanent magnet on the bottom of the platform connection component 206 and may be electrically controlled to reverse (or cancel) the magnetic field to repel (or release) the permanent magnet on the bottom of the platform connection component 206. In an example, a cable 202 connecting a drone to the platform connection component 206 may be physically coupled to the platform connection component 206. In another example, an end (e.g., distal from the drone) of the cable 202 may include an electrically reversible magnet 204 for connecting with a permanent magnet 208 on the top of the platform connection component 206. In this example, the drone may change to an adjacent platform connection component 206 if the initial platform connection component has a faulty connection, or to move in response to a rearrangement of the drones in the system. The electrically reversible magnetic zones 212 or magnet 204 may be electromagnets arranged to momentarily cancel the magnetic field of one of the permanent magnets for release of the platform connection component 206, support component 210, or the cable 202.

Using magnets to attach the drone to the support component 210 may allow low friction sliding along the perimeter of the support component 210 to enable drones to reconfigure as the number of drones involved changes. For example, the platform connection component 206 may be repositioned at different points or continuously around the support component 210 using the electrically reversible magnetic zones 212. The support component 210 may include power or balance connectors 214 to supply data or power to or from the drone and the support component 210. In another example, the power or balance connectors 214 may supply data from the IMU to the drone. In yet another example, the drone may communicate with the IMU using the power or balance connectors 214.

Figure 3:
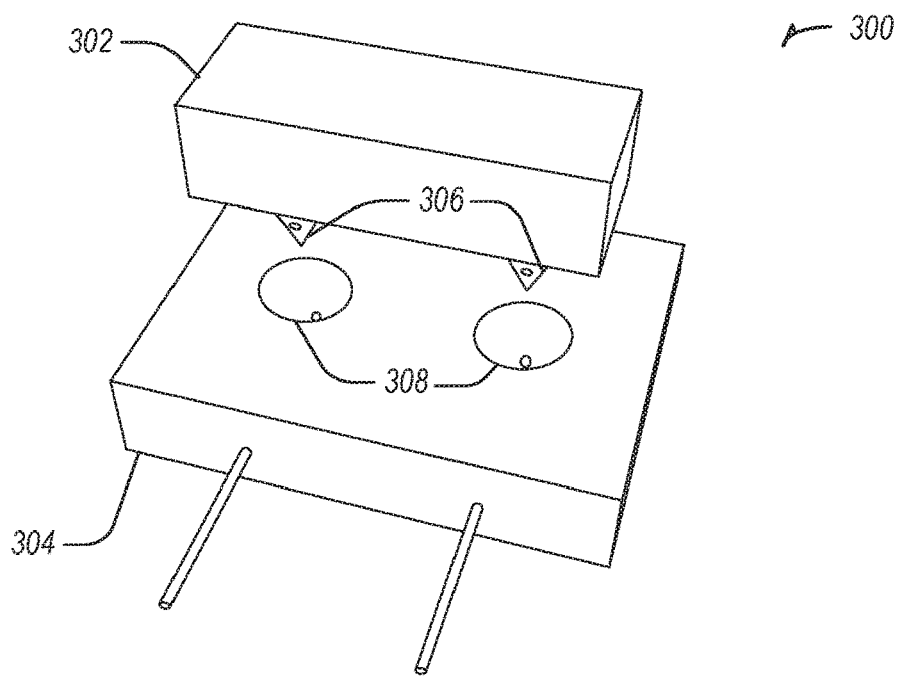
FIG. 3 illustrates a mechanical alignment drone attachment system in accordance with some embodiments.

FIG. 3 illustrates a mechanical alignment drone attachment system 300 in accordance with some embodiments. The mechanical alignment drone attachment system 300 may include one or more alignment cones 306 to attach a platform connection component 302 of a drone to a support component 304. The alignment cones 306 may be used to align the platform connection component 302 with alignment openings 308 in the support component 304. In an example, a solenoid or a pin may be used to attach the platform connection component 302 to the support component 304. A plurality of alignment openings 308 may be arranged on the support component 304 such that the platform connection component 302 may be placed at different locations on the support component 304.

Figure 4:
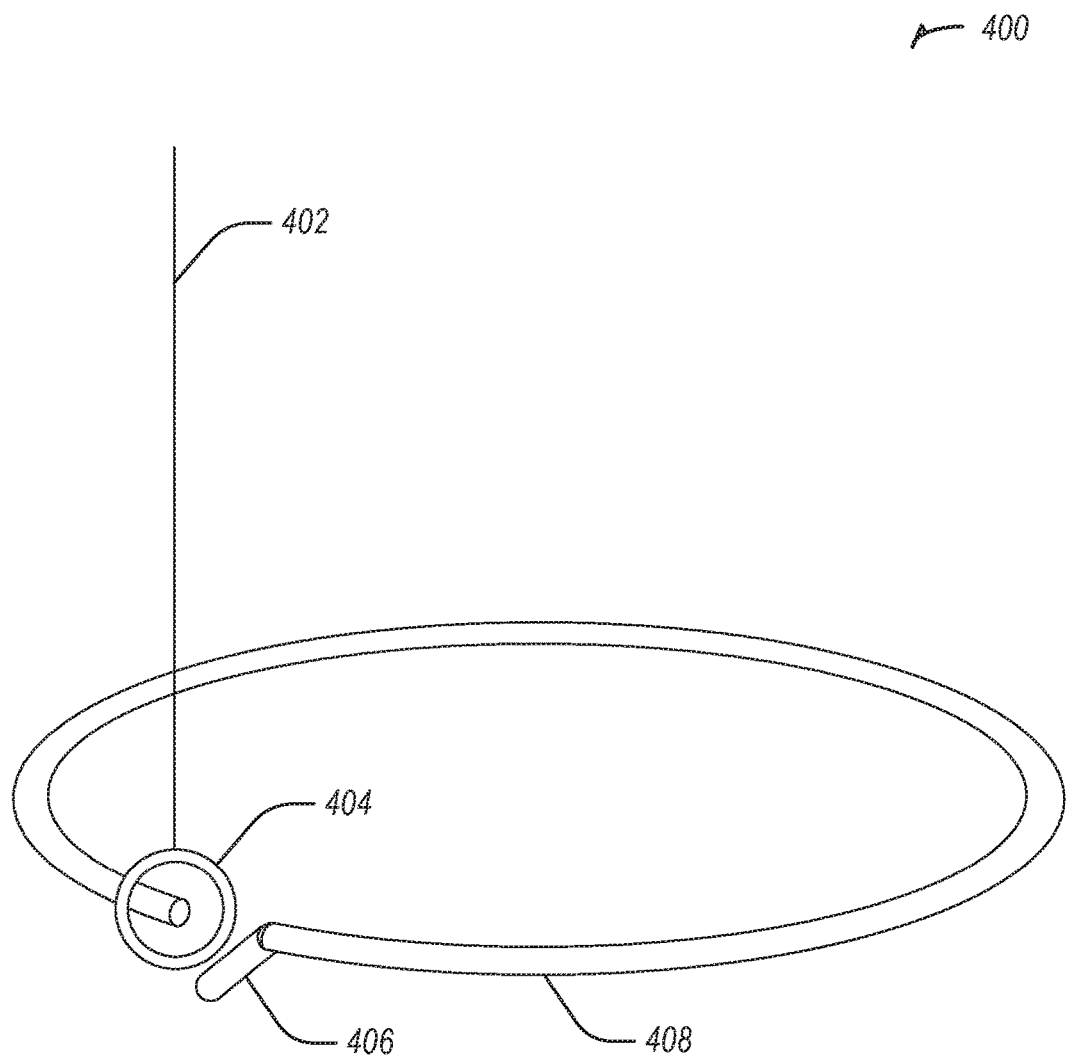
FIG. 4 illustrates a ring and solenoid drone attachment system in accordance with some embodiments.

FIG. 4 illustrates a ring and solenoid drone attachment system 400 in accordance with some embodiments. The ring and solenoid drone attachment system 400 includes a support component ring 408 and a drone cable attachment ring 404. The drone cable attachment ring 404 may be attached to a cable 402, which may connect to a drone. The support component ring 408 may include a solenoid control latch 406. In an example, the solenoid control latch 406 may be controlled to open to allow the drone cable attachment ring 404 to enter or exit the support component ring 408, thereby attaching or detaching the drone from a support platform respectively. The support component ring 408 may, in an example, include a plurality of solenoid control latches to allow the drone cable attachment ring 404 to enter or exit the support component ring 408 at different locations.

The drone cable attachment ring 404 may slide around the support component ring 408 after the solenoid control latch 406 is closed. In an example, the drone cable attachment ring 404 may be a magnet such that the drone cable attachment ring 404 may be configured to not physically touch the support component ring 408. This feature may be used when moving the drone around the support component ring 408. In an example, the solenoid control latch 406 may be configured such that it avoids interference with a magnetometer on the drone or on the IMU.

Figure 5:
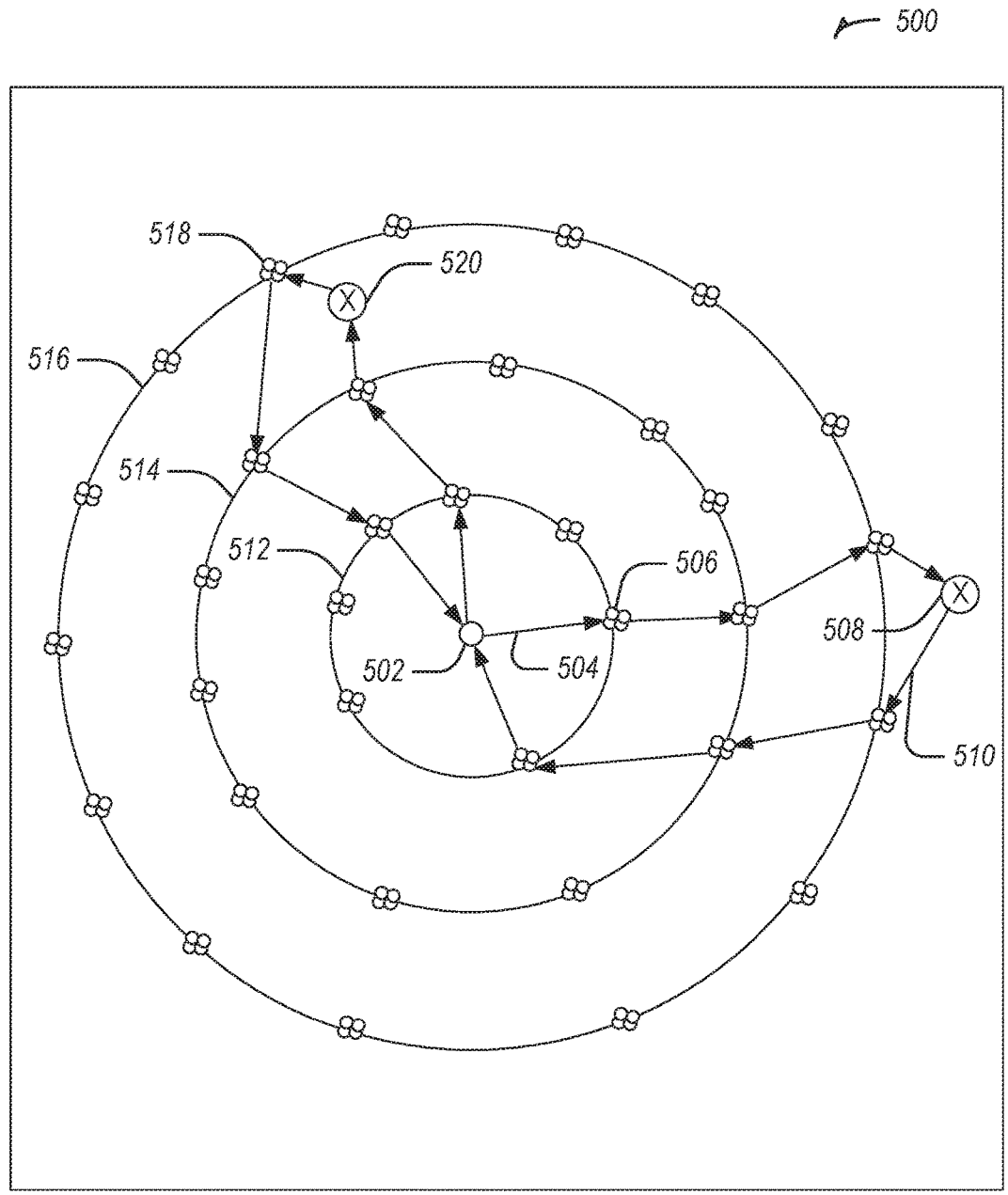
FIG. 5 illustrates a drone base station and target map in accordance with some embodiments.

FIG. 5 illustrates a drone base station and target map 500 in accordance with some embodiments. The map 500 includes a plurality of base stations (e.g., 506, 508, and 518) located at positions around a distribution center 502. For example, the base stations may be located in circles around the distribution center 502, such as at a first radius 512, a second radius 514, and a third radius 516. The base stations shown in FIG. 5 are meant as examples, and other arrangements may be used (e.g., a grid, locations along busy or predicted delivery routes, based on available resources, or the like). Base stations may be spaced closer in dense population areas, in close proximity to the distribution center 502, or the like. Arrangement of base stations may be customized based on delivery routes (e.g., using optimization techniques such as Euclidean path or traveling salesman route minimization techniques).

The base stations may include charging platforms for recharging a drone. For example, when a drone exits a networked drone system due to a low battery, the drone may return to a charging platform at a base station to recharge. A replacement drone may leave the charging platform or another charging platform (e.g., at another that or base station) to join a networked drone system. In an example, spare drones may be stationed on charging platform near a drone battery travel limit. For example, the base station 506 may be located at a distance from the distribution center 502 such that the distance traveled by drones in a networked drone system would cause the drones to have a low battery.

In an example, a networked drone system may include a plurality of drones including a parent drone and one or more child drones. The networked drone system may start at the distribution center 502 and carry cargo from to a delivery target 508. The delivery target 508 may be at a location such as a home or warehouse for delivery of the cargo. The networked drone system may take a path to the delivery target 508 that passes near (e.g., within a mile, within a battery limit distance, or the like) base stations, such as the base station 506. The networked drone system may take a direct path 504 from the distribution center 502 to the base station 506. When the networked drone system approaches or passes the base station 506, replacement drones may be added to the networked drone system and low battery drones may be removed. The networked drone station may proceed to the delivery target 508 including taking a most direct path that still passes over or near base stations. Due to the cargo weight, the direct path may be used to minimize issues with battery life. A return trip for the networked drone system may include a less direct path, such as starting along path 510. The path for the return trip may be used to organize drones at particular base stations.

In another example, a networked drone system may take cargo to a second delivery target 520. After delivery, the networked drone system may proceed, in an example, to a base station 518 that is farther away from the second delivery target 520 than the distribution center 502. The base station 518 may be a closest base station to the second delivery target 520 so that the networked drone system may replace drones with low battery. In an example, the networked drone system may pick up cargo to return to the distribution center 502 (e.g., for cargo return) or may deliver to a third delivery target.

Figure 6:
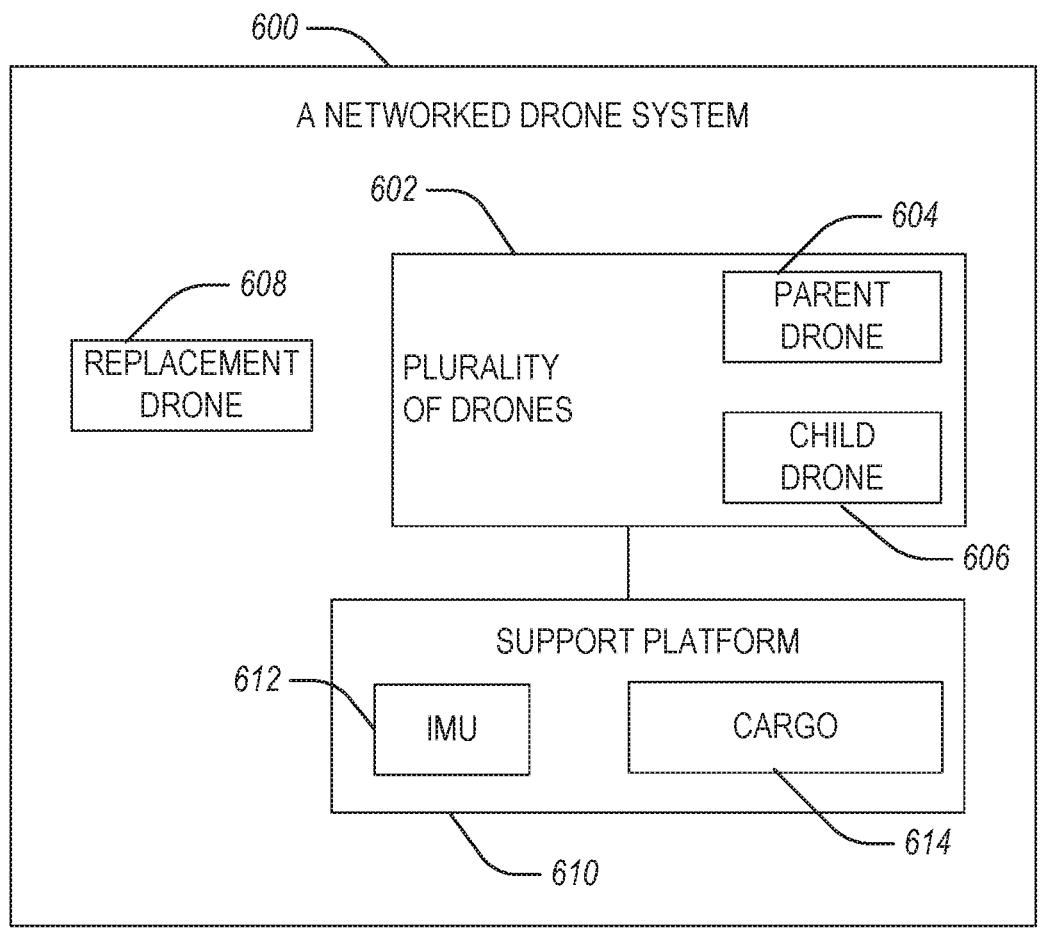
FIG. 6 illustrates a networked drone system in accordance with some embodiments.

FIG. 6 illustrates a networked drone system 600 in accordance with some embodiments. The networked drone system 600 includes a plurality of drones 602 including a parent drone 604 and at least one child drone 606. The networked drone system 600 may include a replacement drone 608. The plurality of drones 602 support and move a support platform 610, which includes an IMU 612, and may support cargo 614, such as a package for remote delivery.

In an example, the IMU 612 may capture support platform balance information related to the support platform 610. The IMU 612 may transmit the support platform balance information, for example to the parent drone 604, the child drone 606, any other drone in the plurality of drones 602, the replacement drone 608, or a combination of drones. The parent drone 604 may be controllable by a remote control device. The remote control device may be used to send a movement command to the parent drone 604, causing the parent drone 604 to move while maintaining support of the support platform 610.

The replacement drone 608 may join the plurality of drones 602, such as during flight, and the replacement drone 608 may then be used to support and move the support platform 610. In an example, the replacement drone 608 may join the plurality of drones 602 when the parent drone 604 or one of the at least one child drone 606 has a low battery. In another example, the replacement drone 608 may join the plurality of drones 602 for redundancy. One of the at least one child drones 606 may leave the plurality of drones 602 in response to the replacement drone 608 joining the plurality of drones 602.

In an example, drones in the plurality of drones 602 may reconfigure their orientation with respect to each other or the support platform 610, for example, in response to the replacement drone 608 being indicated as joining the plurality of drones 602, in response to one of the plurality of drones 602 being indicated as leaving the plurality of drones 602, or in response to a failure or dead battery of a drone of the plurality of drones 602. When a drone leaves or the replacement drone 608 enters the plurality of drones 602, drones in the plurality of drones may be rearranged again.

When the parent drone 604 leaves the plurality of drones 602, one of the at least one child drones 606 may take over as the parent drone 604. When a replacement drone 608 is added to the plurality of drones 602 and the parent drone 604 leaves, the replacement drone 608 or one of the at least one child drones 606 may take over as a parent drone. The new parent drone may be controllable by the remote control device.

In an example, the IMU 612 may transmit the support platform balance information to all drones in the plurality of drones 602. In another example, the IMU 612 may transmit the support platform balance information to only the parent drone 604, the parent drone 604 to communicate the support platform balance information to remaining drones in the plurality of drones 602 (e.g., the at least one child drone 606). In an example, the IMU 612 may transmit the support platform balance information wirelessly to the parent drone 602 or the at least one child drone 606. In another example, the IMU 612 may transmit the support platform balance information along a wire within a support cable to the parent drone 604, the support cable connecting the support platform 610 to a drone receiving the transmission. The support platform balance information may include a yaw, a pitch, or a roll of the support platform 610. The plurality of drones 602 may compensate for changes in the yaw, the pitch, or the roll of the support platform 610 using a control system, the control system to separately control each drone in the plurality of drones 602. The control system may include a local control system for each drone in the plurality of drones 602.

In an example, the at least one child drone 606 includes at least two child drones, the at least two child drones and the parent drone 604 configured to dynamically support the support platform 610. In an example, the at least one child drone 606 is to maintain a specified distance from the parent drone. The at least one child drone 606 may maintain a specified distance from another child drone.

The parent drone 604 may receive an indication of a low battery in a drone in the networked drone system 600, the indication including an identification of the replacement drone 608 to replace the drone with the low battery in the networked drone system 600. The parent drone 604 may send a reconfiguration command to the at least one child drone 606 to incorporate the replacement drone 608 in the networked drone system 600. The reconfiguration command may include a first operation to configure drones the networked drone system 600 in a first arrangement including the drone with the low battery and the replacement drone 608 and a second operation to configure drones in the networked drone system 600 in a second arrangement including the replacement drone 608 without the drone with the low battery, after the drone with the low battery is removed from the networked drone system 600. The drone with the low battery may be configured to return to a recharging station after being removed from the networked drone system 600.

Figure 7:
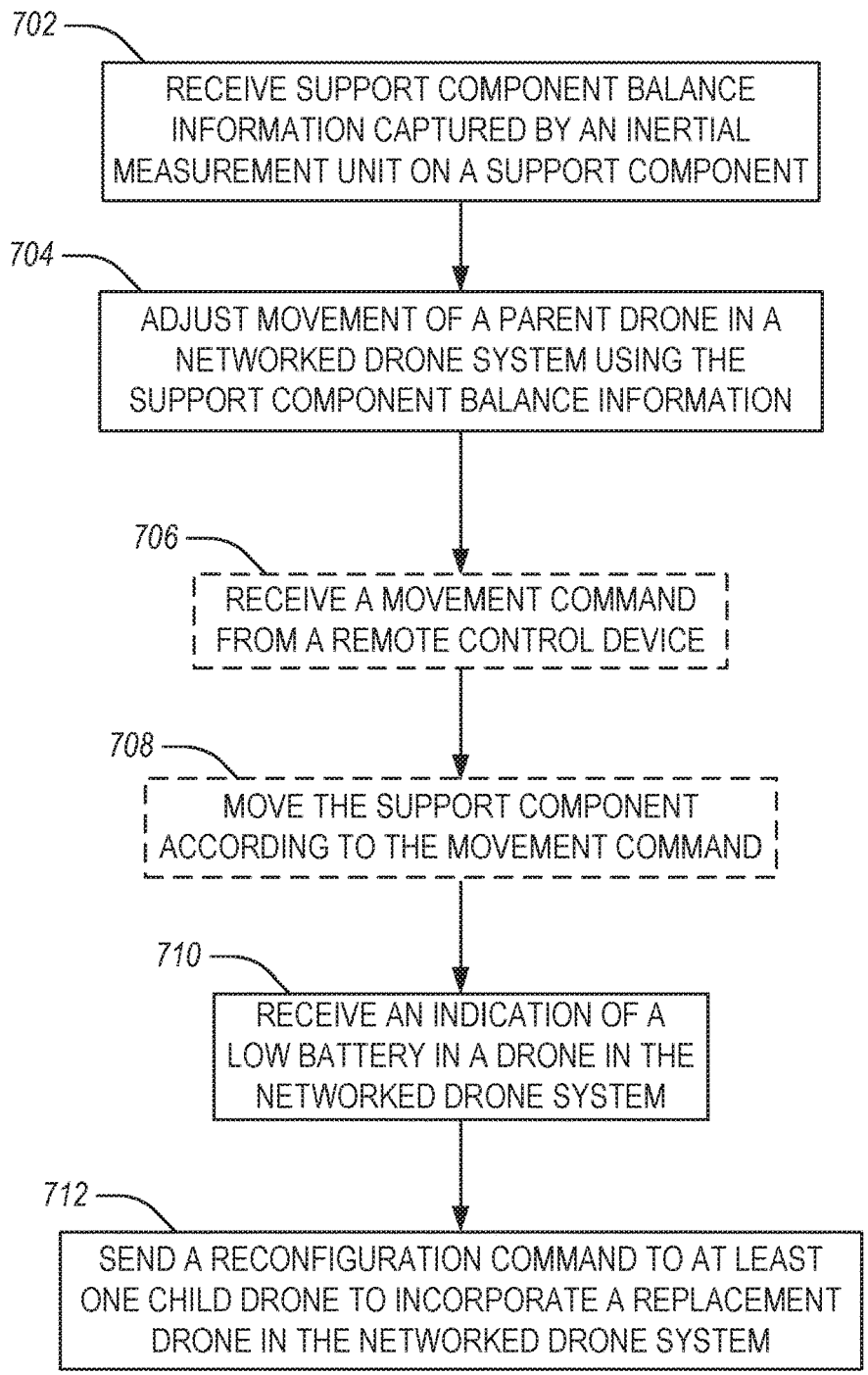
FIG. 7 illustrates a flowchart showing a technique for using a networked drone system to support and move a support component in accordance with some embodiments.

FIG. 7 illustrates a flowchart showing a technique 700 for using a networked drone system to support and move a support component in accordance with some embodiments.

The technique 700 includes an operation 702 to receive support component balance information captured by an inertial measurement unit (IMU) on a support component. The support component balance information may be received at a parent drone, and the IMU may be located on a support component supported by the parent drone. Receiving the support component balance information may include receiving the support component balance information wirelessly from the IMU or along a wire within a support cable connecting the support component to the parent drone. The support component balance information may include a yaw, a pitch, or a roll of the support component. The support component may include a net, a platform, a box, etc., configured to carry cargo, such as a package, for example for remote delivery.

The technique 700 includes an operation 704 to adjust movement of a parent drone in a networked drone system using the support component balance information. The movement of the parent drone may be adjusted using a control system. The parent drone may compensate for changes in the yaw, the pitch, or the roll of the support component using the control system (e.g., a feedback control system to incorporate changes in the angles). The technique 700 includes an optional operation 706 to receive a movement command from a remote control device.

The technique 700 includes an optional operation 708 to move the support component according to the movement command. The support component may be moved using the parent drone and at least one child drone. The at least one child drone may move in response to movement of the parent drone or in response to receiving an indication to move from the parent drone. The at least one child drone may be configured to maintain a specified distance from the parent drone or from another child drone. The at least one child drone may include at least two child drones.

The technique 700 may include an operation 710 to receive an indication of a low battery in a drone in the networked drone system. The indication may be received at the parent drone and may include an identification of a replacement drone to replace the drone with the low battery in the networked drone system. In an example, the drone with the low battery may be the parent drone and the replacement drone may become a replacement parent drone after the parent drone is removed from the networked drone system. In another example, the drone with the low battery may be a child drone, and the replacement drone may become a replacement child drone.

The technique 700 may include an operation 712 to send a reconfiguration command to at least one child drone to incorporate the replacement drone in the networked drone system. In an example, the reconfiguration command includes a first operation to configure drones the networked drone system in a first arrangement including the drone with the low battery and the replacement drone and a second operation to configure drones in the networked drone system in a second arrangement including the replacement drone without the drone with the low battery, after the drone with the low battery is removed from the networked drone system. The drone with the low battery may return to a recharging station after being removed from the networked drone system.

Figure 8:
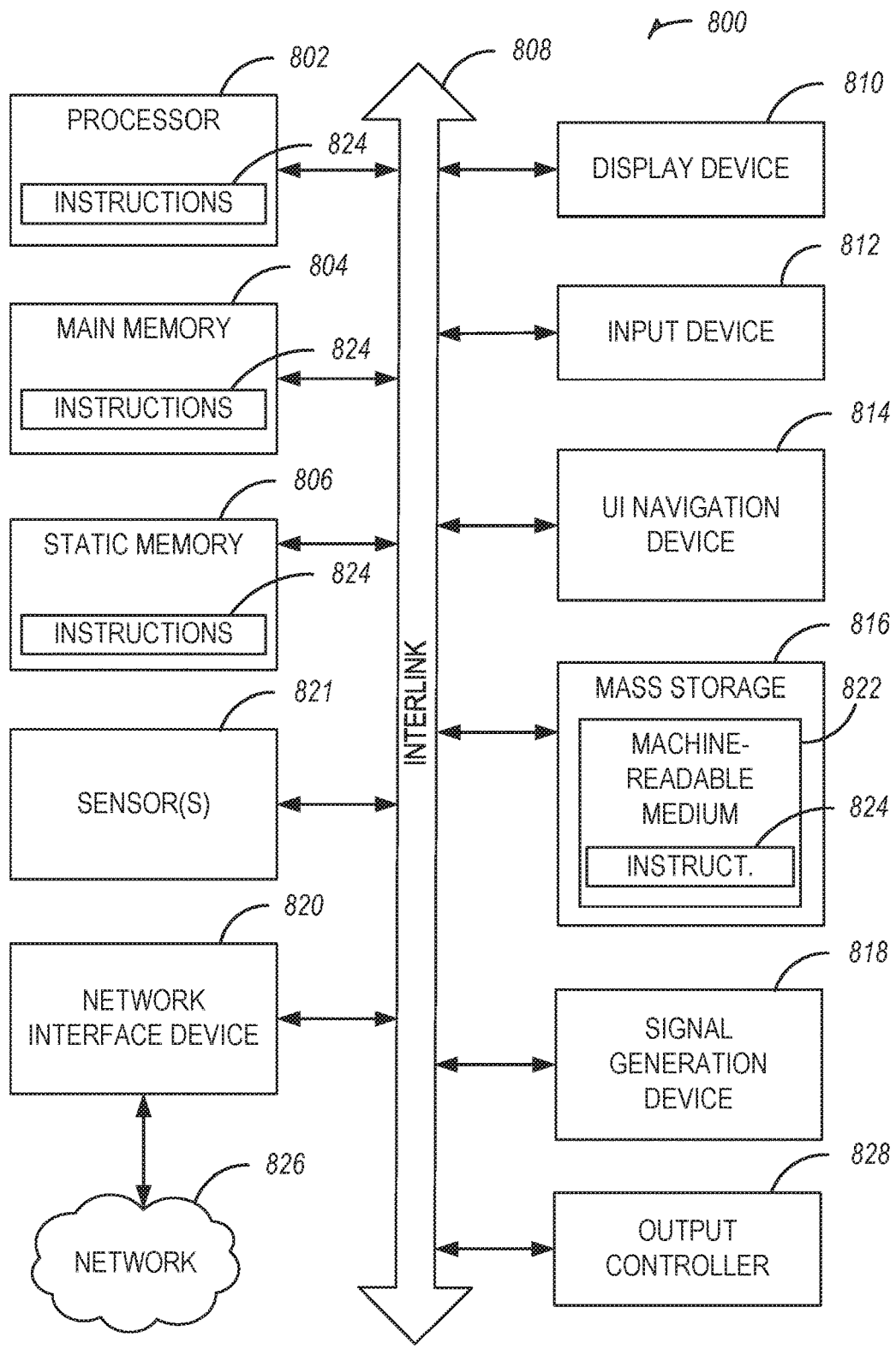
FIG. 8 illustrates generally an example of a block diagram of a machine upon which any one or more of the techniques (e.g., methodologies) discussed herein may perform in accordance with some embodiments.

FIG. 8 illustrates generally an example of a block diagram of a machine 800 upon which any one or more of the techniques (e.g., methodologies) discussed herein may perform in accordance with some embodiments. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a drone computing device, a control system, an IMU, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc. and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, or associated caches and servers) figured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc. Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a networked drone system, the networked drone system comprising: a support platform including: an inertial measurement unit (IMU) to: capture support platform balance information; and transmit the support platform balance information; a plurality of drones to support and move the support platform, the plurality of drones including: a parent drone controllable by a remote control device, the parent drone to receive the support platform balance information from the IMU; and at least one child drone; and a replacement drone to join the plurality of drones during flight, the replacement drone to support and move the support platform.

In Example 2, the subject matter of Example 1 optionally includes wherein the replacement drone is to join when the at least one child drone has a low battery.

In Example 3, the subject matter of Example 2 optionally includes wherein the at least one child drone is to leave the plurality of drones in response to the replacement drone joining the plurality of drones.

In Example 4, the subject matter of any one or more of Examples 1-3 optionally include wherein an orientation of the plurality of drones is to be reconfigured with respect to the support platform in response to the replacement drone joining the plurality of drones.

In Example 5, the subject matter of any one or more of Examples 1-4 optionally include wherein in response to the replacement drone joining the plurality of drones, the parent drone is to leave the plurality of drones, and in response to the parent drone leaving the plurality of drones, the replacement drone or the at least one child drone to be controllable by the remote control device.

In Example 6, the subject matter of any one or more of Examples 1-5 optionally include wherein the IMU is to transmit the support platform balance information to all drones in the plurality of drones.

In Example 7, the subject matter of any one or more of Examples 1-6 optionally include wherein the IMU is to transmit the support platform balance information to only the parent drone, the parent drone to communicate the support platform balance information to remaining drones in the plurality of drones.

In Example 8, the subject matter of any one or more of Examples 1-7 optionally include wherein the IMU is to transmit the support platform balance information wirelessly to the parent drone.

In Example 9, the subject matter of any one or more of Examples 1-8 optionally include wherein the IMU is to transmit the support platform balance information along a wire within a support cable to the parent drone.

In Example 10, the subject matter of any one or more of Examples 1-9 optionally include wherein the support platform balance information includes a yaw, a pitch, and a roll of the support platform.

In Example 11, the subject matter of Example 10 optionally includes wherein the plurality of drones are to compensate for changes in the yaw, the pitch, or the roll of the support platform using a control system, the control system to separately control each drone in the plurality of drones.

In Example 12, the subject matter of any one or more of Examples 1-11 optionally include wherein the support platform is to carry a package for remote delivery.

In Example 13, the subject matter of any one or more of Examples 1-12 optionally include wherein the at least one child drone includes at least two child drones, and the at least two child drones and the parent drone are to dynamically support the support platform.

In Example 14, the subject matter of any one or more of Examples 1-13 optionally include wherein the parent drone is to receive a movement command from the remote control device causing the parent drone to move while maintaining support of the support platform.

In Example 15, the subject matter of any one or more of Examples 1-14 optionally include wherein the at least one child drone is to maintain a specified distance from the parent drone.

Example 16 is a method for using a networked drone system to support and move a support component, the method comprising: receiving, at a parent drone, support component balance information captured by an inertial measurement unit on the support component supported by the parent drone; adjusting movement of the parent drone according to a control system using the support component balance information; receiving, at the parent drone, a movement command from a remote control device; moving the support component according to the movement command using the parent drone, wherein at least one child drone is to support the support component and is to move in response to movement of the parent drone; receiving, at the parent drone, an indication of a low battery in an indicated drone in the networked drone system, the indication including an identification of a replacement drone to replace the indicated drone with the low battery in the networked drone system; and sending a reconfiguration command to the at least one child drone to incorporate the replacement drone in the networked drone system.

In Example 17, the subject matter of Example 16 optionally includes wherein the reconfiguration command includes a first operation to configure drones the networked drone system in a first arrangement including the indicated drone with the low battery and the replacement drone and a second operation to configure drones in the networked drone system in a second arrangement including the replacement drone without the indicated drone with the low battery, after the indicated drone with the low battery is removed from the networked drone system.

In Example 18, the subject matter of any one or more of Examples 16-17 optionally include wherein the indicated drone with the low battery is the parent drone and the replacement drone is to become a replacement parent drone after the parent drone is removed from the networked drone system.

In Example 19, the subject matter of any one or more of Examples 16-18 optionally include wherein the indicated drone with the low battery is to return to a recharging station after being removed from the networked drone system.

In Example 20, the subject matter of any one or more of Examples 16-19 optionally include wherein the at least one child drone is to maintain a specified distance from the parent drone.

In Example 21, the subject matter of any one or more of Examples 16-20 optionally include wherein receiving the support component balance information includes receiving the support component balance information wirelessly from the inertial measurement unit.

In Example 22, the subject matter of any one or more of Examples 16-21 optionally include wherein receiving the support component balance information includes receiving the support component balance information along a wire within a support cable connecting the support component to the parent drone.

In Example 23, the subject matter of any one or more of Examples 16-22 optionally include wherein the support component balance information includes a yaw, a pitch, and a roll of the support component.

In Example 24, the subject matter of Example 23 optionally includes wherein the parent drone is to compensate for changes in the yaw, the pitch, or the roll of the support component using a control system.

In Example 25, the subject matter of any one or more of Examples 16-24 optionally include wherein the support component is a platform to carry a package for remote delivery.

In Example 26, the subject matter of any one or more of Examples 16-25 optionally include wherein the at least one child drone includes at least two child drones, and the at least two child drones and the parent drone are to dynamically support the support component.

Example 27 is at least one machine-readable medium including instructions for operation of a computing system, which when executed by a machine, cause the machine to perform operations of any of the methods of Examples 16-26.

Example 28 is an apparatus comprising means for performing any of the methods of Examples 16-26.

Example 29 is at least one machine-readable medium including instructions for using a drone in a networked drone system to support and move a support component, which when executed by the drone, cause the drone to: receive support component balance information captured by an inertial measurement unit on the support component supported by the drone; adjust movement of the drone according to a control system using the support component balance information; receive a movement command from a remote control device; move the support component according to the movement command using the drone, wherein at least one child drone is to support the support component and is to move in response to movement of the drone; receive an indication of a low battery in an indicated drone in the networked drone system, the indication including an identification of a replacement drone to replace the indicated drone with the low battery in the networked drone system; and send a reconfiguration command to the at least one child drone to incorporate the replacement drone in the networked drone system.

In Example 30, the subject matter of Example 29 optionally includes wherein the reconfiguration command includes a first operation to configure drones the networked drone system in a first arrangement including the indicated drone with the low battery and the replacement drone and a second operation to configure drones in the networked drone system in a second arrangement including the replacement drone without the indicated drone with the low battery, after the indicated drone with the low battery is removed from the networked drone system.

In Example 31, the subject matter of any one or more of Examples 29-30 optionally include wherein the indicated drone with the low battery is the parent drone and the replacement drone is to become a replacement parent drone after the parent drone is removed from the networked drone system.

In Example 32, the subject matter of any one or more of Examples 29-31 optionally include wherein the indicated drone with the low battery is to return to a recharging station after being removed from the networked drone system.

In Example 33, the subject matter of any one or more of Examples 29-32 optionally include wherein the at least one child drone is to maintain a specified distance from the parent drone.

In Example 34, the subject matter of any one or more of Examples 29-33 optionally include wherein to receive the support component balance information the parent drone is to receive the support component balance information wirelessly from the inertial measurement unit.

In Example 35, the subject matter of any one or more of Examples 29-34 optionally include wherein to receive the support component balance information, the parent drone is to receive the support component balance information along a wire within a support cable connecting the support component to the parent drone.

In Example 36, the subject matter of any one or more of Examples 29-35 optionally include wherein the support component balance information includes a yaw, a pitch, and a roll of the support component.

In Example 37, the subject matter of Example 36 optionally includes wherein the parent drone is to compensate for changes in the yaw, the pitch, or the roll of the support component using a control system.

In Example 38, the subject matter of any one or more of Examples 29-37 optionally include wherein the support component is to carry a package for remote delivery.

In Example 39, the subject matter of any one or more of Examples 29-38 optionally include wherein the at least one child drone includes at least two child drones, and the at least two child drones and the parent drone are to dynamically support the support component.

Example 40 is an apparatus for using a networked drone system to support and move a support component, the apparatus comprising: means for receiving, at a parent drone support component balance information captured by an inertial measurement unit on the support component supported by the parent drone; means for adjusting movement of the parent drone according to a control system using the support component balance information; means for receiving, at the parent drone, a movement command from a remote control device; means for moving the support component according to the movement command using the parent drone, wherein at least one child drone is to support the support component and is to move in response to movement of the parent drone; means for receiving, at the parent drone, an indication of a low battery in an indicated drone in the networked drone system, the indication including an identification of a replacement drone to replace the indicated drone with the low battery in the networked drone system; and means for sending a reconfiguration command to the at least one child drone to incorporate the replacement drone in the networked drone system.

In Example 41, the subject matter of Example 40 optionally includes wherein the reconfiguration command includes a first operation to configure drones the networked drone system in a first arrangement including the indicated drone with the low battery and the replacement drone and a second operation to configure drones in the networked drone system in a second arrangement including the replacement drone without the indicated drone with the low battery, after the indicated drone with the low battery is removed from the networked drone system.

In Example 42, the subject matter of any one or more of Examples 40-41 optionally include wherein the indicated drone with the low battery is the parent drone and the replacement drone is to become a replacement parent drone after the parent drone is removed from the networked drone system.

In Example 43, the subject matter of any one or more of Examples 40-42 optionally include wherein the indicated drone with the low battery is to return to a recharging station after being removed from the networked drone system.

In Example 44, the subject matter of any one or more of Examples 40-43 optionally include wherein the at least one child drone is to maintain a specified distance from the parent drone.

In Example 45, the subject matter of any one or more of Examples 40-44 optionally include wherein the means for receiving the support component balance information include means for receiving the support component balance information wirelessly from the inertial measurement unit.

In Example 46, the subject matter of any one or more of Examples 40-45 optionally include wherein the means for receiving the support component balance information include means for receiving the support component balance information along a wire within a support cable connecting the support component to the parent drone.

In Example 47, the subject matter of any one or more of Examples 40-46 optionally include wherein the support component balance information includes a yaw, a pitch, and a roll of the support component.

In Example 48, the subject matter of Example 47 optionally includes wherein the parent drone is to compensate for changes in the yaw, the pitch, or the roll of the support component using a control system.

In Example 49, the subject matter of any one or more of Examples 40-48 optionally include wherein the support component is to carry a package for remote delivery.

In Example 50, the subject matter of any one or more of Examples 40-49 optionally include wherein the at least one child drone includes at least two child drones, and the at least two child drones and the parent drone are to dynamically support the support component.

Example 51 is a system for using a networked drone system to support and move a support component, the system comprising a parent drone to: receive support component balance information captured by an inertial measurement unit on the support component supported by the parent drone; adjust movement of the parent drone according to a control system using the support component balance information; receive a movement command from a remote control device; move the support component according to the movement command using the parent drone, wherein at least one child drone is to support the support component and is to move in response to movement of the parent drone; receive an indication of a low battery in an indicated drone in the networked drone system, the indication including an identification of a replacement drone to replace the indicated drone with the low battery in the networked drone system; and send a reconfiguration command to the at least one child drone to incorporate the replacement drone in the networked drone system.

In Example 52, the subject matter of Example 51 optionally includes wherein the reconfiguration command includes a first operation to configure drones the networked drone system in a first arrangement including the indicated drone with the low battery and the replacement drone and a second operation to configure drones in the networked drone system in a second arrangement including the replacement drone without the indicated drone with the low battery, after the indicated drone with the low battery is removed from the networked drone system.

In Example 53, the subject matter of any one or more of Examples 51-52 optionally include wherein the indicated drone with the low battery is the parent drone and the replacement drone is to become a replacement parent drone after the parent drone is removed from the networked drone system.

In Example 54, the subject matter of any one or more of Examples 51-53 optionally include wherein the indicated drone with the low battery is further to return to a recharging station after being removed from the networked drone system.

In Example 55, the subject matter of any one or more of Examples 51-54 optionally include wherein the at least one child drone is to maintain a specified distance from the parent drone.

In Example 56, the subject matter of any one or more of Examples 51-55 optionally include wherein to receive the support component balance information, the parent drone is to receive the support component balance information wirelessly from the inertial measurement unit.

In Example 57, the subject matter of any one or more of Examples 51-56 optionally include wherein to receive the support component balance information, the parent drone is to receive the support component balance information along a wire within a support cable connecting the support component to the parent drone.

In Example 58, the subject matter of any one or more of Examples 51-57 optionally include wherein the support component balance information includes a yaw, a pitch, and a roll of the support component.

In Example 59, the subject matter of Example 58 optionally includes wherein the parent drone is further to compensate for changes in the yaw, the pitch, or the roll of the support component using a control system.

In Example 60, the subject matter of any one or more of Examples 51-59 optionally include wherein the support component is a platform to carry a package for remote delivery.

In Example 61, the subject matter of any one or more of Examples 51-60 optionally include wherein the at least one child drone includes at least two child drones, and the at least two child drones and the parent drone are to dynamically support the support component.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAM), read only memories (ROMs), and the like.

What is claimed is:

1. A networked drone system, the networked drone system comprising:
    a support platform including:
    an inertial measurement unit (IMU) configured to:
    capture support platform balance information; and
    transmit the support platform balance information;
    a plurality of drones configured to support and move the support platform, the plurality of drones including:
    a parent drone controllable by a remote control device, the parent drone configured to receive the support platform balance information from the IMU; and
    at least one child drone; and
    a replacement drone configured to join the plurality of drones during flight, the replacement drone configured to support and move the support platform.

2. The networked drone system of claim 1, wherein the replacement drone is configured to join when the at least one child drone has a low battery.

3. The networked drone system of claim 2, wherein the at least one child drone is configured to leave the plurality of drones in response to the replacement drone joining the plurality of drones.

4. The networked drone system of claim 1, wherein an orientation of the plurality of drones is reconfigurable with respect to the support platform in response to the replacement drone joining the plurality of drones.

5. The networked drone system of claim 1, wherein in response to the replacement drone joining the plurality of drones, the parent drone is configured to leave the plurality of drones, and in response to the parent drone leaving the plurality of drones, the replacement drone or the at least one child drone is configured to be controllable by the remote control device.

6. The networked drone system of claim 1, wherein the IMU is configured to transmit the support platform balance information to all drones in the plurality of drones.

7. The networked drone system of claim 1, wherein the IMU is configured to transmit the support platform balance information to only the parent drone, and wherein the parent drone is configured to communicate the support platform balance information to remaining drones in the plurality of drones.

8. The networked drone system of claim 1, wherein the IMU is configured to transmit the support platform balance information wirelessly to the parent drone.

9. The networked drone system of claim 1, wherein the IMU is configured to transmit the support platform balance information along a wire within a support cable to the parent drone.

10. The networked drone system of claim 1, wherein the support platform balance information includes a yaw, a pitch, and a roll of the support platform.

11. The networked drone system of claim 10, wherein the plurality of drones are configured to compensate for changes in the yaw, the pitch, or the roll of the support platform using a control system, the control system to separately control each drone in the plurality of drones.

12. The networked drone system of claim 1, wherein the support platform is configured to carry a package for remote delivery.

13. The networked drone system of claim 1, wherein the at least one child drone includes at least two child drones, and the at least two child drones and the parent drone are configured to dynamically support the support platform.

14. The networked drone system of claim 1, wherein the parent drone is configured to receive a movement command from the remote control device causing the parent drone to move while maintaining support of the support platform.

15. The networked drone system of claim 1, wherein the at least one child drone is configured to maintain a specified distance from the parent drone.

16. A method for using a networked drone system to support and move a support component, the method comprising:
    receiving, at a parent drone, support component balance information captured by an inertial measurement unit on the support component supported by the parent drone;
    adjusting movement of the parent drone according to a control system using the support component balance information;

receiving, at the parent drone, a movement command from a remote control device;

moving the support component according to the movement command using the parent drone;

causing, in response to movement of the parent drone, at least one child drone to support the support component and to move;

receiving, at the parent drone, an indication of a low battery in an indicated drone in the networked drone system, the indication including an identification of a replacement drone to replace the drone with the low battery in the networked drone system; and sending a reconfiguration command to the at least one child drone to incorporate the replacement drone in the networked drone system.

17. The method of claim 16, wherein the reconfiguration command includes:
   a first operation to configure drones in the networked drone system in a first arrangement that includes the indicated drone with the low battery and the replacement drone; and
   a second operation to configure drones in the networked drone system in a second arrangement that includes the replacement drone without the indicated drone with the low battery, after the indicated drone with the low battery is removed from the networked drone system.

18. The method of claim 16, wherein the indicated drone with the low battery is the parent drone and the replacement drone becomes a replacement parent drone after the parent drone is removed from the networked drone system.

19. The method of claim 16, further comprising causing the indicated drone with the low battery to return to a recharging station after being removed from the networked drone system.

20. The method of claim 16, further comprising causing the at least one child drone to maintain a specified distance from the parent drone.

21. At least one non-transitory machine-readable medium including instructions for using a parent drone in a networked drone system to support and move a support component, which when executed by the parent drone, cause the parent drone to:
   process support component balance information captured by an inertial measurement unit on the support component supported by the parent drone;
   adjust movement of the parent drone according to a control system using the support component balance information;
   process a movement command from a remote control device;
   move the support component according to the movement command using the parent drone;
   causing, in response to movement of the parent drone, at least one child drone to support the support component and to move;
   process an indication of a low battery in an indicated drone in the networked drone system, the indication including an identification of a replacement drone to replace the indicated drone with the low battery in the networked drone system; and
   send a reconfiguration command to the at least one child drone to incorporate the replacement drone in the networked drone system.

22. The at least one non-transitory machine-readable medium of claim 21, wherein the reconfiguration command includes:
   a first operation to configure drones in the networked drone system in a first arrangement that includes the indicated drone with the low battery and the replacement drone; and
   a second operation to configure drones in the networked drone system in a second arrangement that includes the replacement drone without the indicated drone with the low battery, after the indicated drone with the low battery is removed from the networked drone system.

23. The at least one non-transitory machine-readable medium of claim 21, wherein the indicated drone with the low battery is the parent drone and the replacement drone becomes a replacement drone after the parent drone is removed from the networked drone system.

24. The at least one non-transitory machine-readable medium of claim 21, wherein the instructions further cause the parent drone to cause the indicated drone with the low battery to return to a recharging station after being removed from the networked drone system.

25. The at least one non-transitory machine-readable medium of claim 21, wherein the instructions further cause the parent drone to cause the at least one child drone to maintain a specified distance from the parent drone.

* * * * *